(12) United States Patent
Melin et al.

(10) Patent No.: US 11,130,254 B2
(45) Date of Patent: Sep. 28, 2021

(54) HANDHELD POWER TOOL

(71) Applicant: HUSQVARNA AB, Huskvarna (SE)

(72) Inventors: Patrik Melin, Huskvarna (SE); Albin Hagberg, Jönköping (SE); Göran Landén, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 97 days.

(21) Appl. No.: 16/473,320

(22) PCT Filed: Dec. 11, 2017

(86) PCT No.: PCT/SE2017/051241
§ 371 (c)(1),
(2) Date: Jun. 25, 2019

(87) PCT Pub. No.: WO2018/124956
PCT Pub. Date: Jul. 5, 2018

(65) Prior Publication Data
US 2019/0366579 A1 Dec. 5, 2019

(30) Foreign Application Priority Data
Dec. 29, 2016 (SE) .................... 1651753-4

(51) Int. Cl.
B27B 17/08 (2006.01)
A01G 23/08 (2006.01)
(Continued)

(52) U.S. Cl.
CPC .............. B27B 17/08 (2013.01); A01G 23/08 (2013.01); B27B 17/0033 (2013.01);
(Continued)

(58) Field of Classification Search
CPC .... A01G 23/08; B27B 17/0033; B27B 17/02; B27B 17/08; F16F 15/04; F16F 15/1201
See application file for complete search history.

(56) References Cited

U.S. PATENT DOCUMENTS 1,975,938 A    11/1910  Downey
3,059,491 A    10/1962  Hoff et al.
(Continued)

FOREIGN PATENT DOCUMENTS

CN    1636681 A     7/2005
CN    201128028 Y   10/2008
(Continued)

OTHER PUBLICATIONS

International Type Search Report for Swedish Application No. 1651753-4 dated Jul. 14, 2017.
(Continued)

Primary Examiner — Stephen Choi
(74) Attorney, Agent, or Firm — Burr & Forman, LLP

(57) ABSTRACT

A sprocket arrangement (5) for a handheld power tool such as a saw, comprising a drive unit configured to rotate a drive shaft and cutting tool configured to be driven by the drive shaft (21) via the sprocket arrangement. The sprocket arrangement (5) comprises a gear (1) and at least one flexible element (6a, 6b) arranged such that the drive shaft (21) in the handheld power tool is resiliently connected to the cutting tool in the handheld power tool. A handheld power tool comprising a drive unit, a drive shaft, driving means, and a sprocket arrangement is also provided.

18 Claims, 5 Drawing Sheets

(51) Int. Cl.
   *B27B 17/00* (2006.01)
   *B27B 17/02* (2006.01)
   *F16F 15/04* (2006.01)
   *F16F 15/12* (2006.01)

(52) U.S. Cl.
   CPC .............. *B27B 17/02* (2013.01); *F16F 15/04* (2013.01); *F16F 15/1201* (2013.01)

(56) References Cited

U.S. PATENT DOCUMENTS

| | | | |
|---|---|---|---|
| 3,224,473 A | | 12/1965 | Dobbertin et al. |
| 3,257,860 A | * | 6/1966 | Runde .................... F16H 55/30 474/94 |
| 3,339,596 A | | 9/1967 | Deelman |
| 3,410,147 A | | 11/1968 | Scott-Jackson |
| 4,010,544 A | | 3/1977 | Siman |
| 4,321,750 A | | 3/1982 | Sugihara |
| 4,348,199 A | | 9/1982 | Oonuma et al. |
| 4,414,876 A | * | 11/1983 | Loigerot ................ B23D 65/00 30/381 |
| 4,869,709 A | | 9/1989 | Nagano |
| 4,876,796 A | * | 10/1989 | Calkins .................. B27B 17/08 30/283 |
| 2005/0170925 A1 | * | 8/2005 | Hamilton ................ F16H 55/06 474/161 |
| 2009/0093329 A1 | * | 4/2009 | Markley ................ F16H 55/30 474/161 |

FOREIGN PATENT DOCUMENTS

| | | |
|---|---|---|
| CN | 101658962 | 3/2010 |
| CN | 202292916 U | 7/2012 |
| EP | 1996838 A1 | 12/2008 |
| JP | 557173649 A | 10/1982 |

OTHER PUBLICATIONS

International Search Report and Written Opinion in International patent application No. PCT/SE2017/051241 dated Jan. 26, 2018.

\* cited by examiner

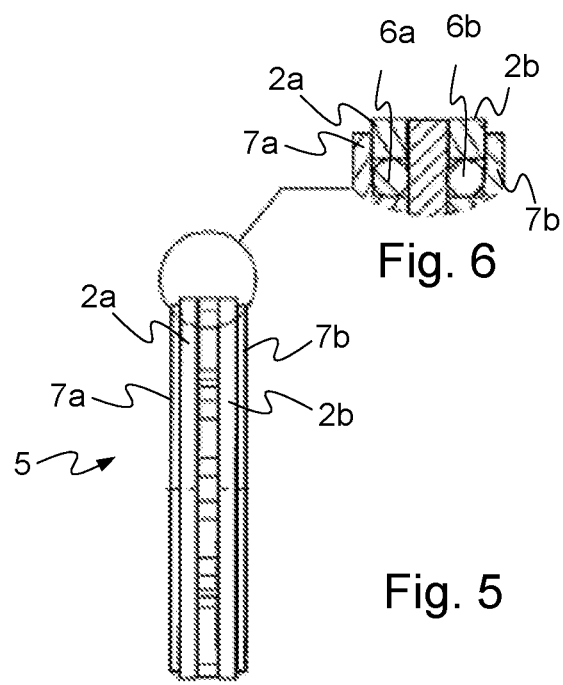
Fig. 6
Fig. 5
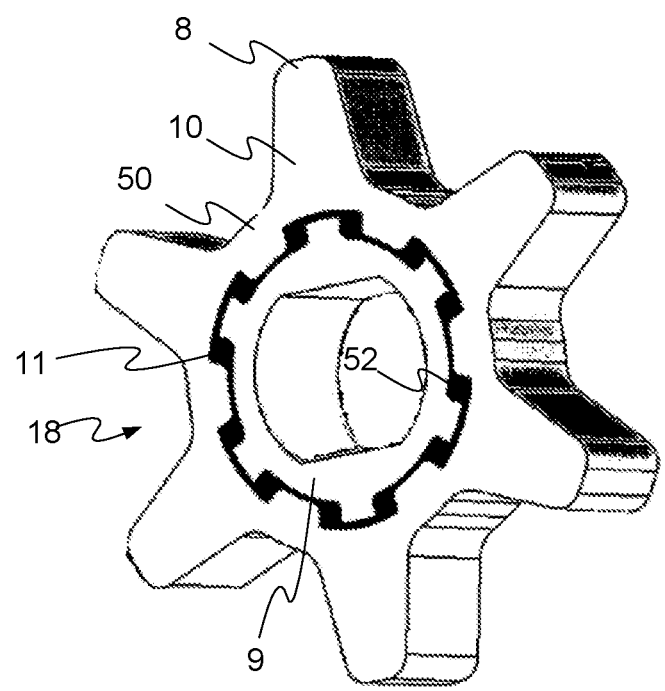
Fig. 7

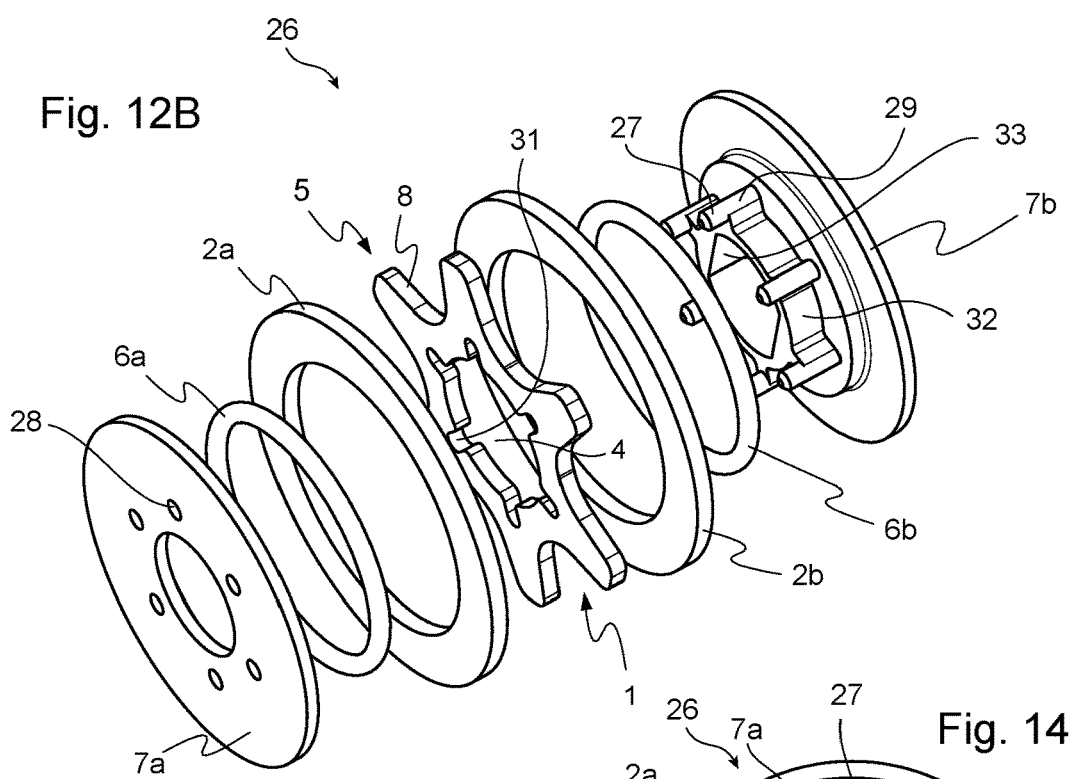
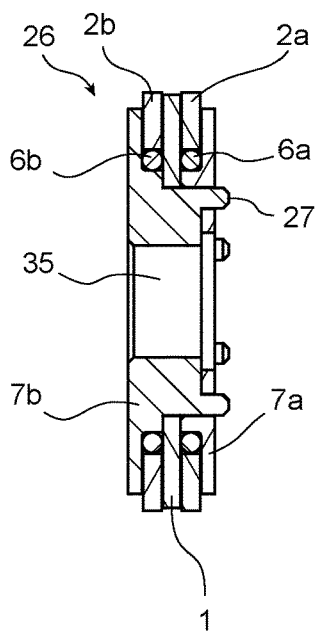
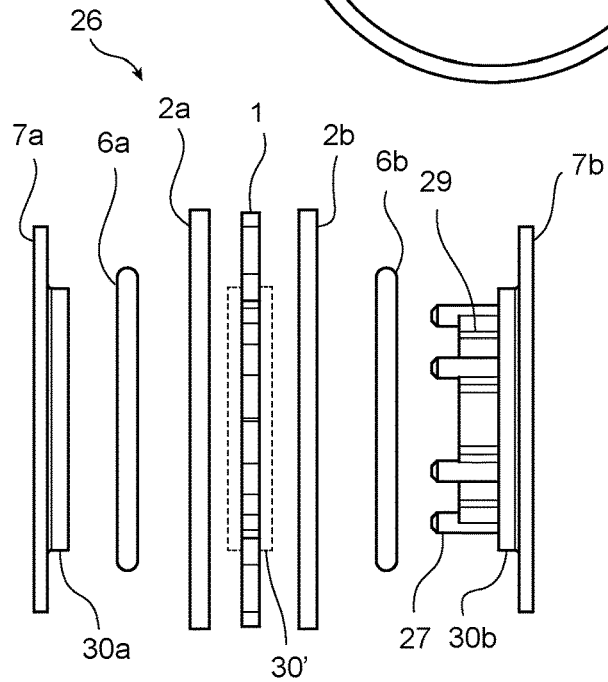

HANDHELD POWER TOOL

TECHNICAL FIELD

The present invention relates to handheld power tools, such as for example chain saws, and more precisely to dampening of power tools.

BACKGROUND

Handheld power tools are commonly used in both commercial and private settings to cut, saw or in other ways remove material. Handheld power tools may for example be used in forestry for removing unwanted trees or bushes or in gardening applications such as cutting high grass or hedges.

It is desirable to keep the noise and vibrations produced by the tool as low as possible, in order not to disturb people in the surrounding area, spare the worker from stresses as well as obtaining an energy efficient power tool. Additionally, in certain regions of the world, the permissible sound level may soon be lowered, compared to the regulations of today.

There is thus a need for an improved handheld power tool system.

SUMMARY

It is an object of the teachings of this application to overcome the problems listed above by providing a vibration dampening sprocket arrangement comprising at least one flexible element arranged such that the drive unit is separated from the driving means by the flexible element.

The inventors thus provide a sprocket arrangement for a handheld power tool such as a saw, comprising a drive unit configured to rotate a drive shaft and cutting tool configured to be driven by the drive shaft via the sprocket arrangement, wherein the sprocket arrangement comprises a gear and at least one flexible element arranged such that the drive shaft in the handheld power tool is flexibly connected to the cutting tool in the handheld power tool. Optionally, the flexible connection between the drive shaft and the cutting tool, provided by the flexible element, may be resilient.

It is a further object of the teachings of this application to provide a handheld power tool comprising a drive unit, a drive shaft, driving means, and a flexible sprocket arrangement such that the drive unit is resiliently separated from the driving means.

The inventors of the present invention have realized, after inventive and insightful reasoning that by utilizing a flexible element provided such that the drive unit is separated from the driving means, the possibility of noise and vibrations propagating through the tool is reduced.

Other aspects are defined by the appended patent claims and are further explained in the detailed description section as well as in the drawings.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which:

FIG. 5 shows a schematic side view of the sprocket arrangement in FIG. 3, FIG. 6 is a section view of a part of the damping arrangement in FIG. 4, FIG. 7 shows an isometric view of a gear according to another embodiment, FIG. 12A is an exploded view, as seen in perspective, of a sprocket arrangement according to yet another embodiment, FIG. 12B is an exploded view of the sprocket arrangement of FIG. 12B, as seen from the side, FIG. 13 is a cross-section of the sprocket arrangement of FIGS. 12A-B, illustrated in an assembled state, and FIG. 14 is a side view of the sprocket arrangement of FIG. 13.

DETAILED DESCRIPTION OF EMBODIMENTS

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout. References herein to axial, radial, and tangential refer, unless otherwise specified, to directions in relation to the rotation axis of the sprocket arrangement.

Figure 1:
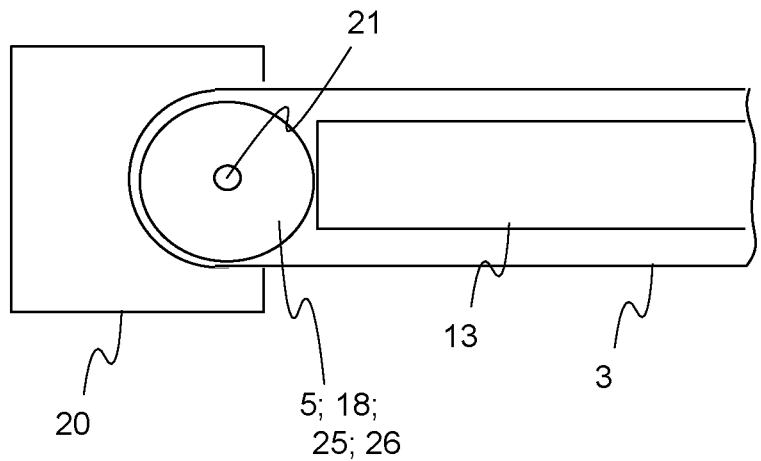
FIG. 1 shows a schematic side view of a part of a power tool.

In FIG. 1, a part of a handheld power tool, e.g. a chain saw, is schematically shown. The power tool comprises a vibration dampening sprocket arrangement 5; 18; 25 which will be further explained below. The power tool further comprises a drive unit 20, which may comprise an electric motor or an internal combustion motor configured to rotate a drive shaft 21. The drive shaft 21 may be identical with, or coaxial with, a motor shaft (not shown) of the drive unit 20. The sprocket arrangement 5; 18; 25; 26 is arranged on the drive shaft 21 and drives a cutting tool, e.g. a cutting chain 3 configured to be moved by the sprocket arrangement along the periphery of a guide bar 13. The sprocket arrangement 5; 18; 25 may be coaxial with the motor shaft.

Figure 2:
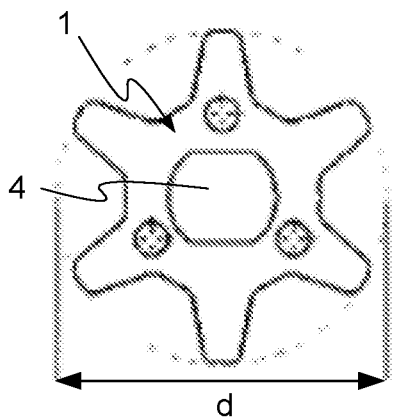
FIG. 2 shows a schematic top view of a gear according to a first embodiment.

FIG. 2 shows a gear or sprocket 1 of a sprocket arrangement 5 for mounting in a power tool (not shown), to drive the chain 3. The gear 1 is rigid, and may be integrally formed of e.g. metal. The gear 1 comprises an opening 4 through which the drive shaft 21 is insertable, and with which the drive shaft 21 may drivably engage. The gear 1 has a theoretical outer diameter d.

Figure 3:
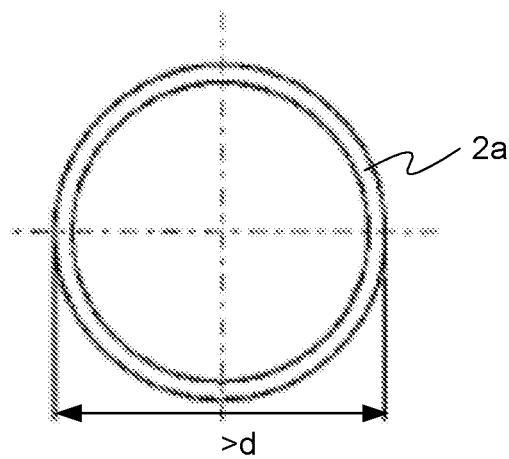
FIG. 3 shows a schematic top view of a wear ring.
Figure 4:
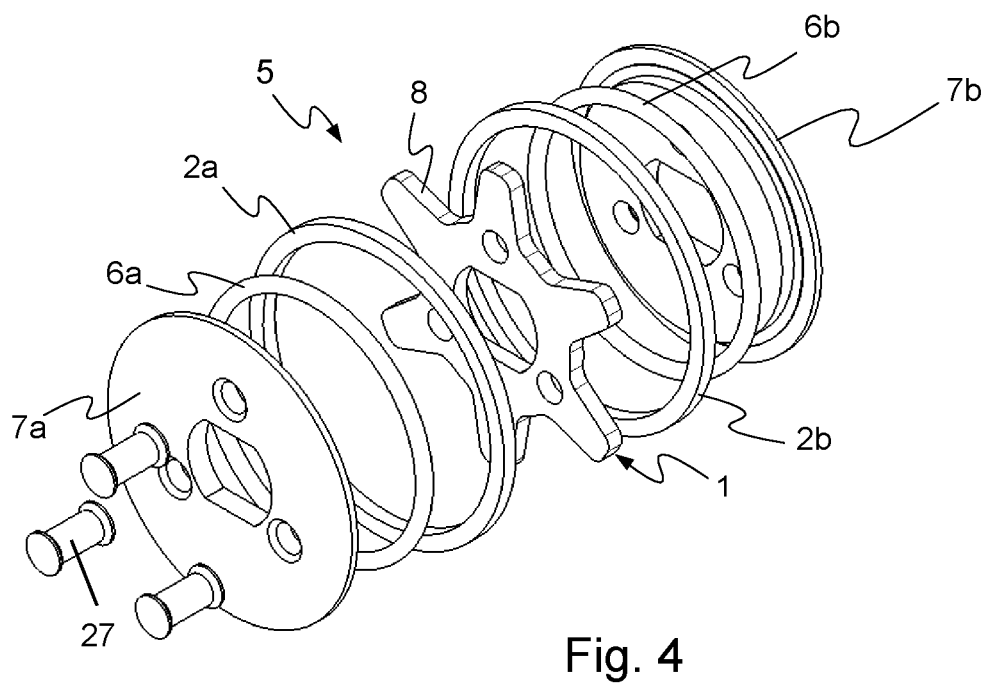
FIG. 4 shows an exploded view of a dampened sprocket arrangement according to an embodiment.
Figure 8:
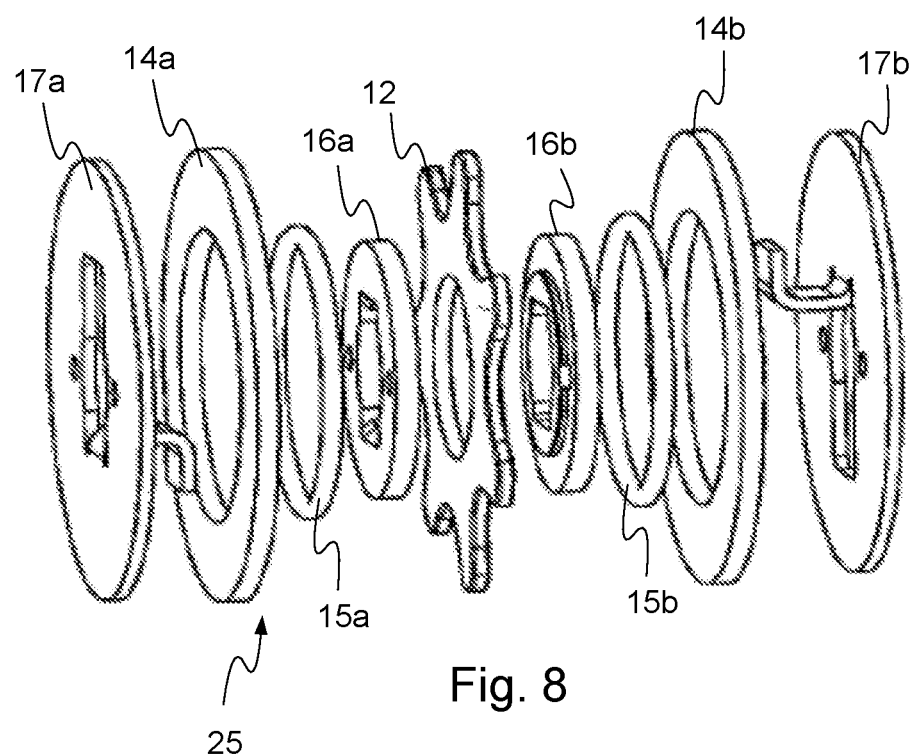
FIG. 8 shows an exploded view of a sprocket arrangement according to a another embodiment.
Figure 9:
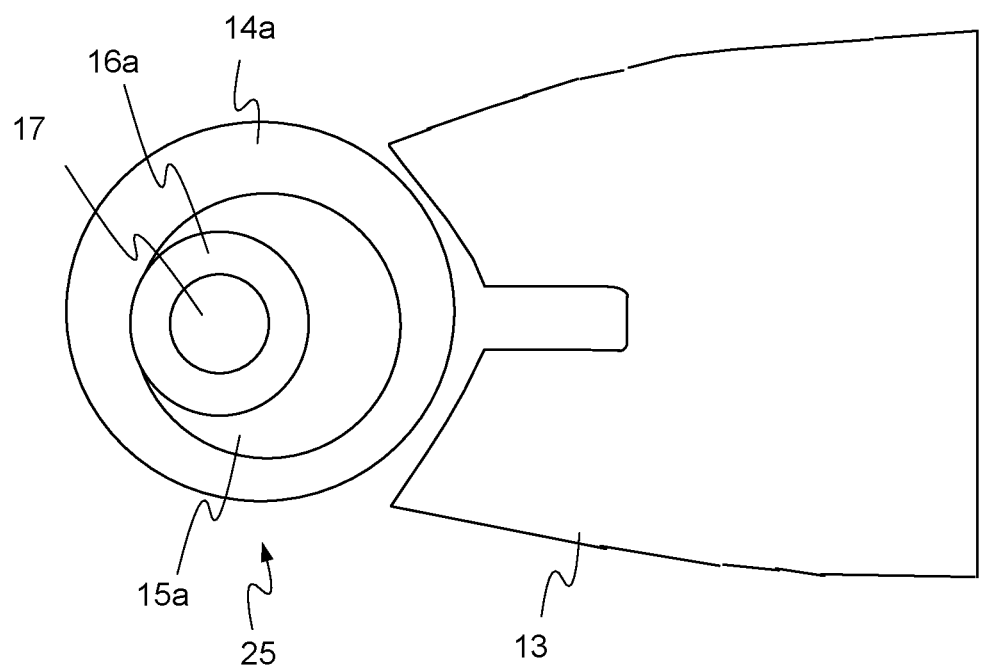
FIG. 9 shows a schematic side view of the sprocket arrangement in FIG. 8.
Figure 10:
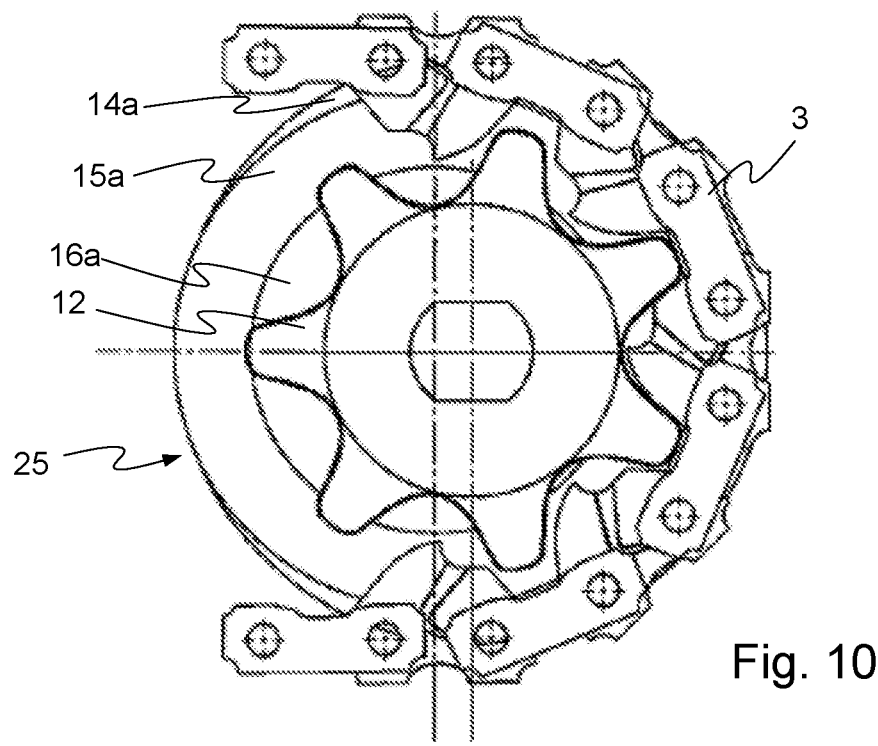
FIG. 10 shows a side view of the sprocket arrangement in FIGS. 8 and 9.
Figure 11:
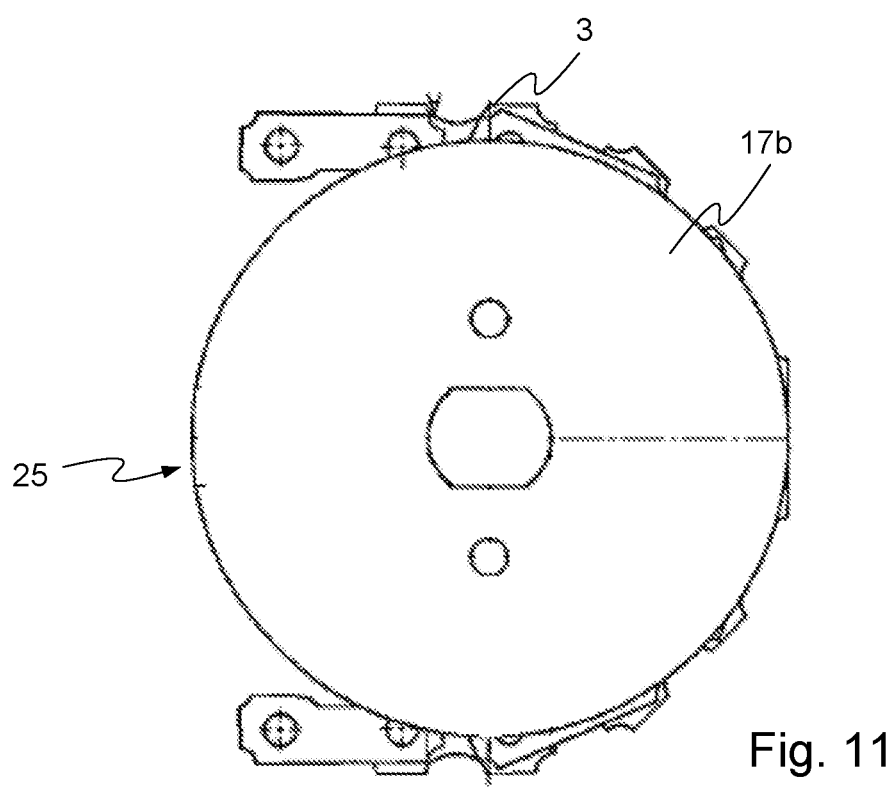
FIG. 11 shows a side view of the sprocket arrangement in FIGS. 8-10.

In FIG. 3, a wear ring 2a of the sprocket arrangement 5 is shown. The wear ring has an outer diameter which is slightly larger than the diameter of the sprocket 1, i.e. >d. FIG. 4 also illustrates a plurality of rivets 27 holding the sprocket arrangement together. When assembled, the rivets 27 penetrate mating holes through the side plates 7a, 7b, and heads of the rivets 27 hold the side plates 7a, 7b together in the axial direction.

The vibration dampening sprocket arrangement 5 is shown in FIG. 4, comprising the gear 1, and two wear rings 2a, 2b located on respective sides of the gear 1. The arrangement 5 further comprises two O-rings 6a, 6b arranged within the wear rings 2a, 2b, and two side plates 7a, 7b arranged on either side of the wear rings 2a, 2b which hold the arrangement 5 together. The assembled sprocket arrangement 5 is shown in FIG. 5, with a section view of an upper portion of the arrangement 5 shown in FIG. 6. As is best illustrated in FIG. 6, each side plate 7a, 7b has a respective support portion axially extending into the respective O-ring 6a, 6b, to radially support the respective O-ring 6a, 6b and wear ring 2a, 2b.

The purpose of the sprocket arrangement 5 is to isolate the drive unit 20 from the driven parts, e.g. the chain 3, of the power tool, which in one embodiment is a chain saw. This arrangement 5 reduces the possibility for noise and vibrations to propagate between the different parts of the tool. It is established that a large part of the noise produced in a power tool derives from when the chain 3 enters the rim and engages with the cogs 8 of the gear 1. By splitting up the gear 1 into different parts and providing a cushioning therebetween, isolation between the parts is obtained. This is accomplished by the inventive sprocket arrangement 5. In an alternative embodiment, the sprocket arrangement 5 may comprise another type of mechanical cushioning, e.g. a spring or similar, instead of the O-rings 6a, 6b, being examples of a flexible element used to separate the handheld power tool from the chain 3. The flexible element thus acting as a dampening means. The flexible element may be a resilient element, and may be formed of a resilient material such as natural or synthetic rubber. The material may also operate as an absorber for absorbing vibrations.

When the arrangement 5 is mounted in a power tool and the chain 3 enters the rim, the chain tie strap is radially carried by the wear rings 2a, 2b before the drive links contact the teeth of the gear 1. Each O-ring 6a, 6b is compressed between the support portion of the respective side plate 7a, 7b and the respective wear ring 2a, 2b, when the tie straps contact the wear rings 2a, 2b, until the drive link engages with the gear 1. At the same time, the wear rings 2a, 2b will be pushed slightly backwards, relative to the rotation of the gear 5. The O-rings 6a, 6b and wear rings 2a, 2b are not fixedly attached to the gear 1. Allowing the wear rings 2a, 2b to move in a speed different from the other parts of the sprocket arrangement 5 provides for an even wear of the rings 2a, 2b and also that the wear is more evenly distributed.

Another advantage with this dampened sprocket arrangement 5 is that it is possible to suppress the polygon effect, i.e. that the chain has an uneven velocity when it exits from the sprocket arrangement 5. This is possible since there is a possibility of compression in the drive system, thanks to the cushioning O-rings 6a, 6b. Also, the wear on moving parts is reduced since the chain 3 moves smoother and has less irregular movements since the rim is cushioned. Further, a smoother chain movement reduces the risk of the chain de-railing.

The sprocket arrangement may be retrofitted on existing power tools, or it may be included in the production of new power tools. Further advantages with the arrangement 5 is that it provides the user with a more comfortable use of the power tool, compared with a tool without the damping arrangement, since both the noise and vibration levels are reduced.

In another embodiment, shown in FIG. 7, the sprocket arrangement 18 comprises an inner part 9 and an outer part 10, which operates as the gear for engaging with the cutting chain 3 (FIG. 1). The outer part 10, which is rigid and may be integrally formed of e.g. a metal, comprises a body 50 provided with an aperture 52 in its centre, a perimeter of which encloses the inner part 9. The outer part 10 further comprises a set of radially outer cogs or teeth 8 which are integrally formed with, and extend radially outwards from, the body 50. The aperture 52 comprises alternating grooves and protrusions, which face radially inwards and form an internal gear. The external cogs 8 of the outer part 10 engage with the chain 3.

The inner part 9, which is also rigid and may be integrally formed of e.g. metal, is provided with outer cogs, defined by grooves and protrusions optionally matching the inner gear of the outer part 10. Further, the inner part 9 comprises a shaft opening in its centre portion, for drivable connection to the drive shaft 21 (FIG. 1). The inner part 9 is fitted radially inside the outer part 10. Together, the inner part 9 and the outer part 10 form a sprocket arrangement 18. Further, the inner part 9 is fitted onto the shaft 21 and thus, the inner part transfers the movement from the shaft to the outer part 10, driving the chain 3. Between the inner part 9 and the outer part 10 a resilient material 11, such as rubber, is provided. This resilient material provides for a vibratory separation of the output shaft 21 from the chain 3 which drives the cutting equipment. A relative motion of the inner part 9 and the outer part 10 around their common rotation axis 21 is obtained, while allowing the outer rim of the outer part 10 to flexibly adapt to the varying load on the chain due to the polygon effect. Thereby, noise and vibrations are reduced.

In the illustrated embodiments, the dampening arrangement is applied to a sprocket arrangement comprising a spur, but in another embodiment it may alternatively be applied to a rim.

In FIGS. 8-11 another embodiment is disclosed. The sprocket arrangement 25 comprises a gear 12, outer rim washers 14a, 14b, rubber rings 15a, 15b, and rubber ring holders 16a, 16b arranged on the driving shaft 17 and supporting the rubber rings 15a, 15b in the radial direction. The arrangement is kept together by cover washers 17a, 17b, which are provided with axially extending hooks configured to hold the sprocket arrangement 25 together in the axial direction. This is best disclosed in FIG. 8.

Due to the flexibility of the rubber rings 15a, 15b the effective diameter of the sprocket 25 becomes flexible. When the chain 3 moves around the gear 12 it is allowed to move smoother compared to a gear without dampening since it maintains a more even tension. This provides for a reduced polygon effect when the chain 3 moves around the driving rim of the sprocket 25. This results in less noise as well as reduced wear on the chain 3 and the bar 13, and also a more controlled inlet/outlet in the bar 13 and the rim.

FIGS. 12A, 12B, 13, and 14 illustrate yet another embodiment of a sprocket arrangement 26. The sprocket arrangement 26 comprises a sprocket 1 flanked by a first and a second wear ring 2a, 2b. Each of said wear rings 2a, 2b encloses a respective rubber ring 6a, 6b, each of which may follow a circular or otherwise closed path along an inner edge of the respective wear ring 2a, 2b. The rubber rings 6a, 6b may, as illustrated, have a circular cross-section. A first side plate 7a is, on its side facing the sprocket 1, provided with a rubber ring support shoulder 30a (FIG. 12B) configured to engage with and support the first rubber ring 6a in the radial direction. A second side plate 7b is also, on its side facing the sprocket 1, provided with a respective rubber ring support shoulder 30b configured to engage with and support the second rubber ring 6a in the radial direction. Alternatively or additionally, support shoulders 30' configured to support the rubber rings 6a, 6b may extend in the axial direction from the side faces of the sprocket 1. Such support shoulders may be integrally formed with the sprocket 1. The second side plate 7b is also integrally formed with a drive body 32 (FIG. 12A) comprising an inner drive structure 33, facing radially inwards and configured to drivably engage with the drive shaft 21 (FIG. 1) in a tangentially rigid manner, and an outer drive structure 29, facing radially outwards and configured to drivably engage with the sprocket 1 in a tangentially rigid manner. The inner drive structure 33 is configured as a flat portion of the drive shaft engagement aperture 35. The outer drive structure 29 is configured as outer splines configured to mesh with inner splines 31 on the sprocket 1.

The second side plate 7b is also integrally formed with rivet pins 27, which, on assembly, are configured to penetrate respective rivet holes 28 formed in the first side plate 7a, thereby allowing permanently attaching all parts together by riveting. In the illustrated embodiment, the rivet pins 27 also define the outer splines 29 configured to engage with the inner splines 31 of the sprocket 1.

In some of the embodiments shown the flexible element is functionally arranged between the drive shaft and the chain, but it would also fall within the scope of this invention to arrange the flexible element between the drive shaft and sprocket.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A sprocket arrangement for a chain saw, comprising a drive unit configured to rotate a drive shaft, and a cutting tool configured to be driven by the drive shaft via the sprocket arrangement, wherein the sprocket arrangement comprises:
   a gear;
   a first wear ring disposed proximate to a first side of the gear;
   a second wear ring disposed proximate to a second side of the gear opposite the first wear ring;
   a first resilient ring on the first side of the gear proximate to the first wear ring; and
   a second resilient ring on the second side of the gear proximate to the second wear ring, wherein the first and second wear rings have a larger diameter than the first and second resilient rings, and wherein the first and second resilient rings are disposed within an inner periphery of the first and second wear rings, respectively.

2. The sprocket arrangement according to claim 1, wherein the first and second wear rings engage the cutting tool during driving of the cutting tool, and
   wherein the first and second resilient rings support the first and second wear rings, respectively, in a radial direction to provide a connection between the drive shaft and the cutting tool which is resilient in the radial direction, with respect to the rotation axis of the drive shaft.

3. The sprocket arrangement according to claim 2, wherein the first and second resilient rings engage the gear at a portion of the gear that is axially separated from an axis of the gear to resiliently support the cutting tool in the radial direction at a position axially separated from the axis of the gear.

4. The sprocket arrangement according to claim 3, wherein the sprocket arrangement is configured to provide a connection between the drive shaft and the cutting tool which is resilient in a tangential direction, with respect to the rotation axis of the drive shaft.

5. The sprocket arrangement according to claim 1, wherein the first and second wear rings engage the gear at a portion of the gear that is axially separated from an axis of the gear to provide a connection between the drive shaft and the cutting tool which is rigid in the axial direction of the drive shaft.

6. The sprocket arrangement according to claim 1, wherein the gear is configured to be connected to the drive shaft in a tangentially rigid manner, with respect to the rotation axis of the drive shaft.

7. The sprocket arrangement according to claim 1, wherein the gear is rigid, and is configured to be rigidly connected to the drive shaft.

8. The sprocket arrangement according to claim 1, wherein the gear is provided with solid cogs, the solid cogs being integrally formed of a rigid material.

9. The sprocket arrangement according to claim 8, wherein the sprocket arrangement is configured to be connected to the drive shaft such that the first and second resilient rings are operably connected between the drive shaft and the gear.

10. The sprocket arrangement according to claim 1, wherein the first and second resilient rings are rubber rings.

11. The sprocket arrangement according to claim 10, wherein the sprocket arrangement comprises at least one side plate provided with a support shoulder configured to radially support the first and second resilient rings, and the gear is provided with a support shoulder configured to radially support the first and second resilient rings.

12. The sprocket arrangement according to claim 1, wherein an outer diameter of the first and second wear rings is larger than an outer diameter of the gear.

13. The sprocket arrangement according to claim 1, comprising two side plates arranged on either side of the first and second wear rings, wherein the side plates are configured to hold the sprocket arrangement together.

14. The sprocket arrangement according to claim 13, wherein one of the side plates comprises a drive structure configured to drivingly engage with a mating drive structure of the sprocket.

15. The sprocket arrangement according to claim 1, wherein the sprocket arrangement comprises an outer part defined by said gear, and an inner part arranged within the outer part, and wherein the first and second resilient rings each comprise a layer comprising a flexible material provided between the inner part and the outer part.

16. The sprocket arrangement according to claim 1, wherein the first and second resilient rings each comprise rubber rings provided on ring holders, and wherein one of the rubber rings and one of the ring holders is provided on either side of the gear.

17. A chain saw comprising a drive unit, a drive shaft, a cutting chain, and a sprocket arrangement, the sprocket arrangement comprising:
a gear;
a first wear ring disposed proximate to a first side of the gear;
a second wear ring disposed proximate to a second side of the gear opposite the first wear ring;
a first resilient ring on the first side of the gear proximate to the first wear ring; and
a second resilient ring on the second side of the gear proximate to the second wear ring, wherein the first and second wear rings have a larger diameter than the first and second resilient rings, and wherein the first and second resilient rings are disposed within an inner periphery of the first and second wear rings, respectively.

18. The chain saw according to claim 17, wherein the chain saw is a battery driven chain saw or a pole saw.

* * * * *